United States Patent
Fain et al.

(10) Patent No.: US 11,610,205 B1
(45) Date of Patent: Mar. 21, 2023

(54) MACHINE LEARNING BASED DETECTION OF FRAUDULENT ACQUIRER TRANSACTIONS

(71) Applicant: Wells Fargo Bank, N.A., San Francisco, CA (US)

(72) Inventors: Eliza Fain, San Francisco, CA (US); Dilip Menon, San Francisco, CA (US); Prasanth Nandanuru, Seriligampally (IN); Paramdeep Singh, San Francisco, CA (US); Jimmy C. Wang, Alamo, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 349 days.

(21) Appl. No.: 16/418,289

(22) Filed: May 21, 2019

(51) Int. Cl.
*G06Q 40/02* (2012.01)
*G06Q 20/40* (2012.01)
*G06Q 20/10* (2012.01)
*G06N 20/00* (2019.01)

(52) U.S. Cl.
CPC ......... *G06Q 20/4016* (2013.01); *G06N 20/00* (2019.01); *G06Q 20/1085* (2013.01); *G06Q 40/02* (2013.01)

(58) Field of Classification Search
CPC .......... G06Q 20/4016; G06Q 20/1085; G06Q 40/02; G06N 20/00
See application file for complete search history.

(56) References Cited

U.S. PATENT DOCUMENTS

| 5,220,501 A | * | 6/1993 | Lawlor | G06Q 20/18 |
| | | | | 705/40 |
| 5,386,104 A | | 1/1995 | Sime | |
| 7,100,195 B1 | * | 8/2006 | Underwood | H04L 63/0823 |
| | | | | 707/999.009 |
| 7,500,599 B2 | * | 3/2009 | Swift | G06Q 20/403 |
| | | | | 235/382 |
| 7,668,769 B2 | | 2/2010 | Baker et al. | |

(Continued)

FOREIGN PATENT DOCUMENTS

| CN | 103400110 A | * | 11/2013 | |
| GB | 2484552 A | * | 4/2012 | ........... G07F 19/207 |

OTHER PUBLICATIONS

Cluckey, Suzanne, ATM Networks at risk of cyberattacks, FEIEC warns, Apr. 3, 2014, ATM marketplace, web, pp. 1-4 (Year: 2014).*

(Continued)

*Primary Examiner* — I Jung Liu
(74) *Attorney, Agent, or Firm* — Foley & Lardner LLP (57) ABSTRACT

Examples described herein relate to apparatuses and methods of detecting fraudulent activity at an automated teller machine (ATM) using a machine learning model. A method includes receiving ATM activity data indicative of one or more withdrawal transactions at one or more ATMs using a transaction card, receiving transaction data and ATM data, ingesting the transaction data and the ATM data, analyzing the ingested transaction data and the ingested ATM data using a machine learning model, determining that the ingested transaction data and the ingested ATM data indicate a likelihood of fraudulent activity using the machine learning model, and performing, using the machine learning model, one or more remedial actions based on the determined likelihood of fraudulent activity.

14 Claims, 5 Drawing Sheets

(56) References Cited

U.S. PATENT DOCUMENTS

| | | | |
|---|---|---|---|
| 7,970,701 | B2 | 6/2011 | Lewis et al. |
| 9,147,324 | B2 | 9/2015 | Lin et al. |
| 9,818,126 | B1 | 11/2017 | Faith et al. |
| 10,083,483 | B2 * | 9/2018 | Bhakta .................. G06Q 40/02 |
| 2006/0202012 | A1 | 9/2006 | Grano et al. |
| 2007/0203826 | A1 | 8/2007 | Russell et al. |
| 2016/0132887 | A1 * | 5/2016 | Lacoss-Arnold ..... G07F 19/207 705/43 |
| 2016/0358140 | A1 | 12/2016 | Pigg et al. |
| 2016/0364794 | A1 | 12/2016 | Chari et al. |
| 2017/0046217 | A1 * | 2/2017 | Shinde ................ G06F 11/3495 |
| 2018/0285844 | A1 | 10/2018 | Schroder et al. |
| 2019/0378050 | A1 * | 12/2019 | Edkin .................... G06N 20/20 |

OTHER PUBLICATIONS

Antonella et al.; Introducing ATMs in India: a contexual inquiry; Nov. 3, 2003; Elsevier, web, 30-39 (Year: 2003).*

Nezhad et al., "Fuzzy Logic and Takagi-Sugeno Neural-Fuzzy to Deutsch Bank Fraud Transactions", 15 pages, dated Apr. 17, 2013.

Reardon et al., "Visualization of ATM Usage Patterns to Detect Counterfeit Cards Usage", 2-12 45th Hawaii International Conference on System Sciences, IEEE Computer Society; 8 pages.

Singh et al., "Fraud Detection by Monitoring Customer Behavior and Activities", International Journal of Computer Applications (0975-8887), vol. 111—No. 11, Feb. 2015. 10 pages.

Visa to Offer Its Own Fraud Detection for Plus ATM Network Transactions, 2 pages, vol. 7, No. 21, dated Jun. 8, 2006.

* cited by examiner

MACHINE LEARNING BASED DETECTION OF FRAUDULENT ACQUIRER TRANSACTIONS

TECHNICAL FIELD

Embodiments of the present disclosure relate generally to the field of detecting fraudulent activity.

BACKGROUND

Conventional fraud detection systems attempt to mitigate financial loss or customer inconveniences by receiving fraud-related data, and reacting to potential fraudulent activity through analysis of the received data. For example, a fraud detection system may receive transaction activity data relating to various transactions, store the activity data, and analyze the activity for fraudulent indications in a batch after a set time period has passed. In such a system, fraud detection may occur well after the fraudulent activity and financial loss and/or inconvenience has already taken place. In some cases, the fraudulent activity is manually reviewed in an offline nature and cases of fraud may be missed altogether.

SUMMARY

A first example embodiment relates to a method including receiving ATM activity data indicative of one or more withdrawal transactions at one or more ATMs using a transaction card, receiving transaction data and ATM data, ingesting the transaction data and the ATM data, analyzing the ingested transaction data and the ingested ATM data using a machine learning model, determining that the ingested transaction data and the ingested ATM data indicate a likelihood of fraudulent activity using the machine learning model, and performing one or more remedial actions based on the determined likelihood of fraudulent activity using the machine learning model.

Another example embodiment relates to a provider computing system including a network interface, and a processing circuit including one or more processors coupled to non-transitory memory, the memory comprising an ATM database and a transaction database. The processing circuit is configured to receive ATM activity data indicative of one or more withdrawal transactions at one or more ATMs using a transaction card, receive transaction data and ATM data, ingesting the transaction data and the ATM data, analyze the ingested transaction data and the ingested ATM data using a machine learning model, determine that the ingested transaction data and the ingested ATM data indicate a likelihood of fraudulent activity using the machine learning model, and perform one or more remedial actions based on the determined likelihood of fraudulent activity using the machine learning model.

Another example embodiment relates to a computer-implemented method of providing real-time detection of fraudulent activity at an ATM using a machine learning model. The method includes training the machine learning model includes receiving a set of training data, preparing the set of training data for model training, performing the model training using the prepared training data, and deploying a trained machine learning model for operation. The method further includes receiving real-time transaction data and real-time ATM data, where the real-time transaction data relating to a withdrawal occurring at an ATM and the real-time ATM data relating to the ATM. The method further includes ingesting the real-time transaction data and the real-time ATM data, analyzing the real-time transaction data and the real-time ATM data using the trained machine learning model, determining that the real-time transaction data and the real-time ATM data indicate a likelihood of fraudulent activity using the trained machine learning model, and performing one or more remedial actions based on the determined likelihood of fraudulent activity using the trained machine learning model.

These and other features, together with the organization and manner of operation thereof, will become apparent from the following detailed description when taken in conjunction with the accompanying drawings.

DETAILED DESCRIPTION

Referring to the figures generally, systems and methods of providing real-time detection of fraudulent activity are described. Based on ATM identification data, ATM card data, date and time data, authorization code data, and various other contextual transaction data, the system described herein detects whether fraudulent activity is occurring at one or more ATMs. For example, fraudsters may use acquirer cards that are obtained or recreated using fraudulent means to perform cash withdrawals of large sums of money from one or more ATMs. In some cases, fraudsters perform cash withdrawals at a single ATM in quick succession and in some cases, fraudsters may perform cash withdrawals across many ATMs simultaneously.

Accordingly, the present disclosure is directed to systems and methods for detecting fraudulent activity relating to stolen and/or reproduced acquirer cards. More specifically, the systems and methods described herein use various data relating to transactions, such as cash withdrawals, performed at one or more ATMs using the stolen or reproduced cards to detect fraudulent transactions in real-time as the withdrawals are occurring. In some instances, fraudsters may steal or attempt to reproduce transaction cards and use the stolen or reproduced transaction cards at one or more ATMs to withdraw large sums of money. In some cases, the fraudsters use a single ATM and perform multiple cash withdrawals in quick succession and in some cases, the fraudsters use multiple ATMs to simultaneously withdraw cash at each of the ATMs. In any case, the fraudster may attempt to withdraw cash from ATMs managed by a different provider than the provider managing the transaction card that was stolen or reproduced. The large cash withdrawals resulting from these types of fraudulent transactions may result in a rapid depletion of available cash at the ATMs, thereby resulting in inconveniences to legitimate users of the ATM attempting to withdraw cash and/or unnecessary overhead costs to the ATM provider by way of cash vendor dispatches to the ATM. By detecting real-time fraudulent activity occurring at one or more ATMs, the systems and methods described herein can employ remedial measures to stem the effect of the fraudulent activity. For example, real-time detection of fraudulent activity can guard against depletion of cash reserves at the ATM and save the ATM provider money and time that may otherwise be spent refilling the ATM with cash.

The embodiments described herein solve the technical problem of detecting potential fraudulent activity at an ATM that may otherwise go unnoticed by a provider of the ATM for a period of time. By leveraging uniquely assembled information sets, including real-time data received directly from an ATM and historical data relating to transactions at an ATM, the systems and methods described herein facilitate the real-time detection of fraudulent activity occurring at one or more ATMs. In this way, the systems and methods described herein are proactive in detecting and acting on the fraudulent activity such that the effect felt by a provider of an ATM is minimized or eliminated. For example, the systems and methods described herein detect activity, such as large cash withdrawals at an ATM, as the activity is occurring such that a proactive action can be taken, e.g., declining the transaction, disabling the transaction card, etc., before large amounts of cash can be withdrawn from the ATM. To detect fraudulent activity in real-time, the systems and methods described herein leverage a trainable machine learning model. Specifically, the systems and methods described herein use a Decision Tree Classifier Algorithm, but other types of models may be used. The trainable machine learning model is nimble in learning new and/or modified characteristics of fraud and/or behaviors of fraudsters. In this way, the systems and methods described herein are adaptable to the changing methods fraudsters may use to accomplish fraudulent activity without having to use complex code stubs which may or may not capture the subtleties of the fraudsters' behaviors. As compared with any existing actions taken in response to the detection of fraudulent behavior, the systems and methods described herein do not have to rely on executing scripts, etc., on large volumes of data after a transaction is performed. Instead, the machine learning model described herein performs real-time detection, which reduces the overall computer processing power necessary to detect fraudulent activity, while also more effectively and proactively addressing fraud.

Figure 1:
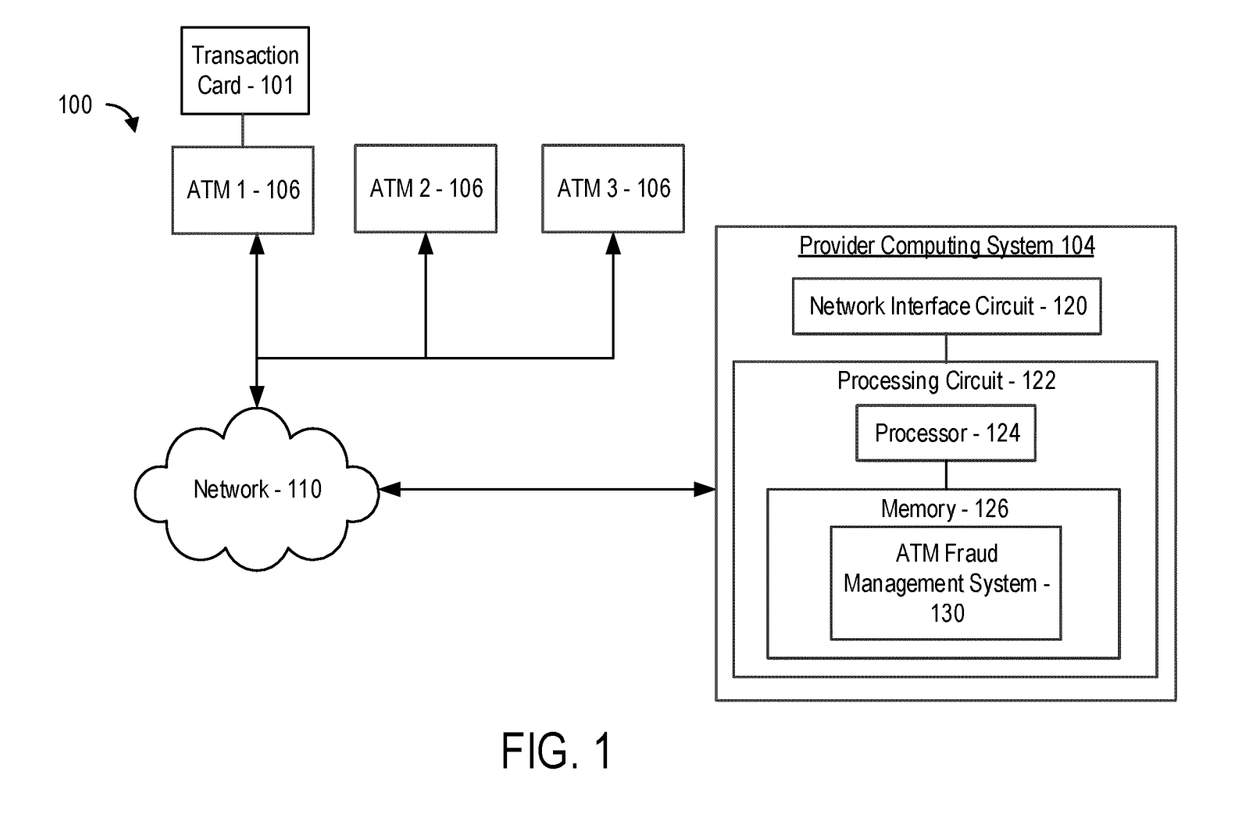
FIG. 1 is a block diagram depicting an example environment for detecting real-time ATM fraudulent activity using a machine learning model, according to an example embodiment.

Referring to FIG. 1, a fraud management system 100 is shown, according to an example embodiment. The management system 100 includes, among other systems, a provider computing system 104 and one or more ATMs 106. The provider computing system 104 includes an ATM fraud management system 130 that is integrated within or otherwise communicable with, the provider computing system 104. The provider computing system 104 and ATM 106 may communicate directly or through a network 110, which may include one or more of the Internet, cellular network, Wi-Fi, Wi-Max, a proprietary banking network, or any other type of wired or wireless network.

According to an embodiment of the disclosure, the ATM 106 is capable of both receiving deposits and dispensing funds. For example, the ATM 106 may include a currency dispenser that is used to dispense currency when the user wishes to perform a cash withdrawal. The ATM 106 may also include a deposit slot that is configured to receive paper currency and checks when the user wishes to make a deposit. The ATM 106 may also be configured to perform other operations, such as allowing the user to check account balances, purchase stamps, and so on. The ATM 106 is owned and operated by a provider associated with the provider computing system 104. Account holders may choose to use ATMs 106 owned by different providers as a matter of convenience. For example, an account holder of a first provider may withdraw money using an ATM 106 owned by the second provider because the second provider's ATM 106 is more conveniently located (e.g., located closer to the account holder's home or workplace). In some instances, fraudsters specifically target ATMs 106 with a different provider than that of a stolen or reproduced transaction card 101. In some cases, the provider of the ATM 106 may not be able to monitor or have knowledge of the cash withdrawal limits of another card-issuing entity. Accordingly, in some cases, it is harder to mitigate the amount or number of the withdrawals using a card that is issued by a different provider than the managing provider of the ATM 106.

The ATM 106 includes a transaction card slot configured to receive a transaction card inserted by a user. The ATM 106 may further include a keypad, or similar user input device, containing a number of buttons (e.g., alphanumeric, etc.) configured to receive input (e.g., a PIN) from a user. Additionally, or alternatively, the ATM 106 may incorporate similar user input devices such as touch screens, gesture recognition, and so on. The user utilizes the user input devices, such as the keypad, to navigate a graphical user interface (GUI) of the ATM 106. The GUI allows the user to perform the various functions of the ATM 106 and also display information (e.g., prompts, images, text, etc.) to the user. For example, the GUI of the ATM 106 may display account information (e.g., account balance, account number, etc.) to the user.

To initiate a transaction with the ATM 106, a user may insert a transaction card 101 into a transaction card slot of the ATM 106. The transaction card 101 may be one of several types of transaction cards, including a debit card, a credit card, a stored value card, and the like. The transaction cards may be associated with various financial instruments, including a demand deposit account and/or a line of credit. In some embodiments, data used to identify the instrument is stored on the transaction card 101 on at least one of a magnetic stripe and/or a smart chip (e.g., an EMV chip). The magnetic stripe stores static data, including the primary account number (PAN) associated with the financial instrument as well as a static card security code. Different payment brands refer to this security code as a card verification value (CVV), card verification code (CVC), card ID (CID), or the like. Because the data is static, the magnetic stripes can be easily cloned or duplicated by thieves using skimming devices or other methods. Although the risk of fraudulent activity may be significantly reduced through the use of transaction cards containing smart chips, there is still a potential for fraud even with the use of smart chips. Fraudsters can use a variety of other methods for obtaining card and personal data, such as stealing cards, stealing financially sensitive mail or other documents having sensitive information and using the information to order a new card with a changed address, performing data breaches to gather stored card and personal data, using fake ATMs to receive data from a swiped, dipped, or inserted card, purchasing sensitive data, etc. Fraudsters can then either use the stolen card to make cash withdrawals at one or more ATMs 106 or use stolen information to reproduce the transaction card to then make cash withdrawals at one or more ATMs 106.

Still referring to FIG. 1, the transaction card slot of the ATM 106 is connected to a card reader. ATM card readers may operate via one of three user actions: swiping, dipping, and inserting. Swiping involves the user passing only the magnetic stripe of a transaction card through a reader. Dipping involves quickly inserting and then removing the card from the card reader. Inserting involves inserting the transaction card fully into a card slot, where it is "grabbed" by the reader to remain within the terminal for the duration of the transaction. After the transaction card 101 has been authenticated, details of the withdrawal transaction and financial instrument data obtained from the transaction card 101 are transmitted to the provider computing system 104 via the network 110, where the transaction is processed. Transaction and financial instrument data may include, but is not limited to, the transaction card number, ATM identification data, transaction date, transaction time, transaction amount, authorization code, etc. As described further herein, the fraud management system 100 uses the transmitted data to determine whether a transaction may be fraudulent in nature. The fraud management system 100 uses a machine learning model to perform an analysis of the transaction data and ATM data to detect fraudulent activity occurring in real-time.

The provider computing system 104 is operated by a provider, which is an entity that facilitates various types of transactions between a user and various other entities. In some instances, the provider manages the debit and/or credit card held by the user requesting funds from the ATM 106. In other instances, the provider permits cash withdrawals from user holding accounts at other providers. For example, an acquirer transaction may take place at the ATM 106, where the provider permits the use of a transaction card 101 from another card-issuing entity to complete a withdrawal transaction at the ATM 106. The provider may be a bank, credit union, a payment services company, or other similar entities. The provider computing system 104 includes, among other systems, a network interface 120 enabling the provider computing system 104 to exchange data over network 110, a processing circuit 122, and an ATM fraud management system 130.

The processing circuit 122 includes a processor 124 and memory 126. The processor 124 may be implemented as one or more application specific integrated circuits (ASICs), field programmable gate arrays (FPGAs), a group of processing components, or other suitable electronic processing components. Memory 126 may be one or more devices (e.g., RAM, ROM, Flash memory, hard disk storage) for storing data and/or computer code for completing and/or facilitating the various processes described herein. Memory 126 may be or include non-transient volatile memory, non-volatile memory, and non-transitory computer storage media. Memory 126 may include database components, object code components, script components, or any other type of information structure for supporting the various activities and information structures described herein. Memory 126 may be communicably coupled to the processor 124 and include computer code or instructions for executing one or more processes described herein.

Still referring to FIG. 1, the provider computing system 104 is further shown to include an ATM fraud management system 130. The ATM fraud management system 130 is configured to determine whether fraudulent activity is occurring at one or more of the ATMs 106. As described further herein, the ATM fraud management system 130 gathers information relating to the ATM 106, ATM card 101, date, time, contextual transaction information, etc., and uses a machine learning model to determine in real-time whether a fraudster is attempting a fraudulent transaction at the ATM 106. Specifically, among other uses, the ATM fraud management system 130 detects whether a fraudster is making or attempting to withdraw cash from one or more ATMs 106 using a fraudulent transaction card.

Figure 2:
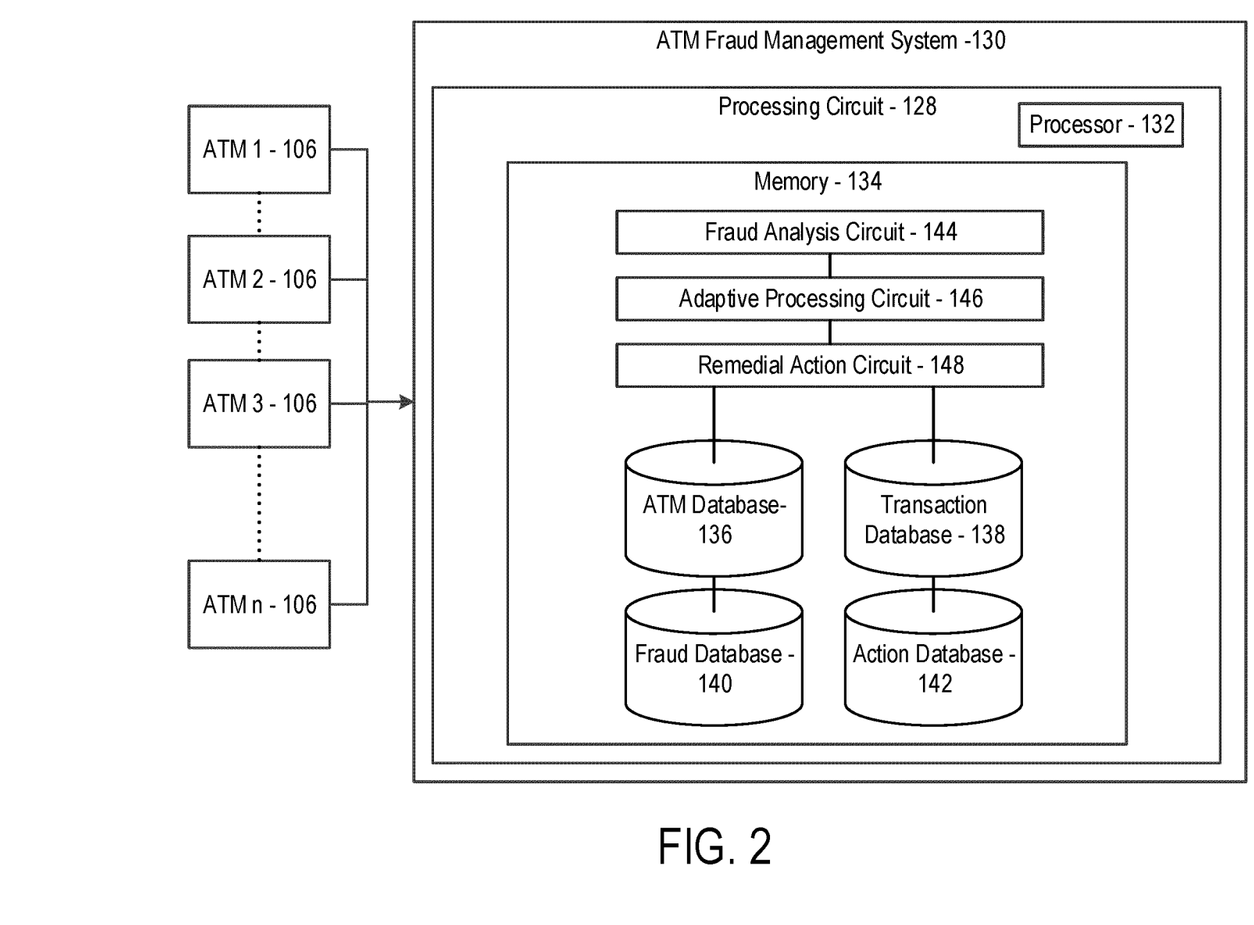
FIG. 2 is a block diagram depicting an ATM fraud management system of the environment in FIG. 1, according to an example embodiment.

Referring now to FIG. 2, the ATM fraud management system 130 includes an ATM database 136, a transaction database 138, a fraud database 140, and an action database 142. The ATM fraud management system 130 also includes a fraud analysis circuit 144, adaptive processing circuit 146, and a remedial action circuit 148. While various circuits, interfaces, and logic with particular functionality are shown, it should be understood that the ATM fraud management system 130 includes any number of circuits, interfaces, and logic for facilitating the functions described herein. For example, the activities of multiple circuits are combined as a single circuit and implemented on the same processing circuit. In some implementations, the ATM fraud management system 130 is partially or completely provided with the provider computing system 104 as described with respect to FIG. 1. For example, the ATM fraud management system 130 or one or more components of the ATM fraud management system 130 may be included in the memory 126 of the provider computing system 104. In other implementations, the ATM fraud management system 130 may be provided as a separate component of the provider computing system 104.

The ATM fraud management system 130 gathers information relating to the ATM 106, transaction card 101, and contextual transaction information. The ATM fraud management system 130 uses this information to make a determination of whether fraudulent activity is occurring in real-time at one or more ATMs 106. According to various embodiments, the information gathered by the ATM fraud management system 130 is data that is obtained as part of a normal process of a withdrawal transaction. Accordingly, no new types of data that are not already organically collected as part of the withdrawal transaction process are necessary for a determination of fraud. In this way, the systems and methods described herein may determine whether activity is fraudulent without using extraneous methods of data information gathering (e.g., capturing a picture of the user, other information not sourced from the transaction itself). In response to a determination that fraudulent activity is occurring, the ATM fraud management system 130 determines a remedial action and completes the remedial action.

The ATM fraud management system 130 is shown to include a processing circuit 128 having a processor 132 and a memory 134. The processor 132 and the memory 134 can be structured as the processor 124 and the memory 126, respectively, as described herein with reference to FIG. 1. The processor 132 may be implemented as one or more application specific integrated circuits (ASICs), field programmable gate arrays (FPGAs), a group of processing components, or other suitable electronic processing components. Memory 134 may be one or more devices (e.g., RAM, ROM, Flash memory, hard disk storage) for storing data and/or computer code for completing and/or facilitating the various processes described herein. Memory 134 may be or include non-transient volatile memory, non-volatile memory, and non-transitory computer storage media. Memory 134 may include database components, object code components, script components, or any other type of information structure for supporting the various activities and information structures described herein. Memory 134 may be communicably coupled to the processor 132 and include computer code or instructions for executing one or more processes described herein.

The ATM database 136 is structured to retrievably store information pertaining to an inventory of ATMs 106. The ATM database 136 may include non-transient data storage mediums (e.g., local disc or flash-based hard drives, local network servers, and the like) or remote data storage facilities (e.g., cloud servers). The ATM database 136 stores information regarding the identification, make and model, location, and status of ATMs 106 including whether the ATM 106 is operational and whether the ATM 106 has been compromised in the past. In various arrangements, historical fraud information may include an ATM identifier, the date and time of reported ATM transactions, the location of the ATM, the number of times transactions at that ATM have been fraudulent, etc.

The transaction database 138 is structured to retrievably store information pertaining to one or more transactions facilitated by the provider computing system 104. The transaction database 138 may include non-transient data storage mediums (e.g., local disc or flash-based hard drives, local network servers, and the like) or remote data storage facilities (e.g., cloud servers). The transaction database 138 stores information regarding the transaction card 101 used, the amount of the transaction, and the date and time of the transaction, among other information. Transactions occurring at an ATM 106 can include a user using their transaction card 101 to withdraw cash from the ATM 106. The user may or may not be an account holder of the provider of the ATM 106. In some instances, as described further herein, a fraudster may have stolen or reproduced a transaction card 101 that is managed by a first provider and may use or attempt to use that stolen or reproduced transaction card 101 at an ATM 106 managed by a second provider. Accordingly, in various arrangements, the transaction information includes stored information regarding all transaction cards 101 used at the provider's ATMs 106, including transaction cards 101 managed by other providers.

The fraud database 140 is structured to retrievably store information pertaining to one or more historical fraudulent transactions that have occurred at the ATMs 106. The fraud database 140 serves as storage for past transactions that have been determined to be fraudulent such that the ATM fraud management system 130 improves upon fraud detection over time. Information relating to the past determined cases of fraudulent activity, such as ATM identification, transaction card information, date, time, authorization code, etc., is also stored in the fraud database 140. In addition, the fraud database 140 may also retrievably store an indication of what about the fraudulent transaction caused the system 130 to make the determination of fraud and what remedial actions were taken in response to the determination of fraud.

The action database 142 is structured to retrievably store information pertaining to one or more remedial actions that may be taken in response to detection of fraudulent activity. The action database 142 may also retrievably store information relating to specific fraudulent cases or types of cases where certain remedial actions were taken. In some arrangements, the action database 142 also retrievably stores information regarding the success (and/or likelihood of success) relating to taking a certain remedial action. The fraud analysis circuit 144 and remedial action circuit 150 retrieve information from the action database 142 to make determinations regarding the types of remedial actions that may be taken in response to a determination of fraudulent activity at the ATMs 106. As such, the action database 142 is communicably and operatively coupled to the fraud analysis circuit 144 and the remedial action circuit 150 to allow access to relevant data. Various examples of remedial actions that may be taken in response to a determination of fraudulent transactions occurring at the ATMs 106 may include, but is not limited to, marking the transaction card numbers as stolen and fraudulent, declining the transaction, displaying a notification that fraudulent activity has been detected, transmitting a notification to a card-issuing entity that the card has been stolen, transmitting a notification to a user that their card information has been stolen, shutting down the ATMs 106, cancelling the transaction card, capturing an image of the fraudsters at the one or more ATMs 106, etc.

The fraud analysis circuit 144 is structured to receive data regarding various transactions occurring at the one or more ATMs 106 and determine in real-time whether one or more transactions are fraudulent based on received and historical data using a machine learning model (e.g., as assisted or received by the adaptive processing circuit 146). The fraud analysis circuit 144 receives transaction and ATM activity data in real-time (e.g., as a transaction is occurring) from the ATMs 106. In this way, the fraud analysis circuit 144 is communicably coupled to the one or more ATMs 106 (e.g., via network 110) to receive ATM 106 information. The received data includes, but is not limited to, transaction card 101 information (including a card number), ATM 106 information (including an ATM identification), and transaction information (including a transaction amount, time, date, and authorization code). The fraud analysis circuit 144 is also communicably and operatively coupled to other circuits and databases of the provider computing system 106 to receive and store historical data. In particular, the fraud analysis circuit 144 communicates with the ATM database 136, transaction database 138, and fraud database 140 to retrieve various data regarding historical transaction activity and historical activity at the ATMs 106 and also communicates with the adaptive processing circuit 146 to facilitate fraudulent transaction detection using a real-time updated machine learning model.

The fraud analysis circuit 144 receives ATM identification information directly from the ATM 106 and from the ATM database 136. The ATM identification allows the ATM fraud management system 130 to determine both the ATMs 106 that are part of a certain transaction occurring in real-time and historical data regarding a particular ATM 106. For example, when a user withdraws or attempts to withdraw cash from an ATM 106, the provider computing system 104 (e.g., the fraud analysis circuit 144) is notified of the transaction and information relating to the transaction, including the ATM identification indication (e.g., ATM identification number). The ATM identification information can be communicated directly to the fraud analysis circuit 144 and stored for later retrieval in the ATM database 136. The fraud analysis circuit 144 thus receives the ATM identification information identifying the one or more ATMs 106 and also retrieves the ATM identification information for the one or more ATMs 106 identified as part of the transaction from the ATM database 136, including any historical information relevant for those ATMs 106. The fraud analysis circuit 144 uses this information as part of the determination of whether fraudulent activity is occurring or has occurred at the identified ATMs 106. For example, using the historical data, the fraud analysis circuit 144 can analyze whether the same or similar cash withdrawal activity has recently occurred at the identified ATMs 106. To do this, the fraud analysis circuit 144 determines whether the same transaction card 101 (e.g., same transaction card number) has been used to make a cash withdrawal recently at the identified ATMs 106. In this way, the fraud analysis circuit 144 can determine whether a quick succession of cash withdrawals using the same transaction card 101 information is occurring at the identified ATMs 106 such that remedial action can be taken in real-time while the withdrawals are occurring.

The fraud analysis circuit 144 also receives transaction information directly from the ATM 106 and from the transaction database 138. The transaction information allows the ATM fraud management system 130 to determine both the transaction information relating to an ongoing, current transaction and historical data regarding transactions. For example, when a user withdraws or attempts to withdraw cash from an ATM 106, the user inserts, swipes, or dips a transaction card 101. The transaction card 101 information is gathered and transmitted to the provider computing system 104, along with other transaction information including transaction amount, date, time, and authorization code. The transaction information can be communicated directly to the fraud analysis circuit 144 and stored for later retrieval in the transaction database 138. The fraud analysis circuit 144 receives the transaction information for the transaction occurring in real-time at the ATM 106 and retrieves historical transaction information from the transaction database 138. The fraud analysis circuit 144 uses the transaction information as part of the determination of whether fraudulent activity is occurring or has occurred at the identified ATMs 106.

For example, using the historical transaction data and the real-time incoming transaction data, the fraud analysis circuit 144 analyzes whether the same transaction card 101 has been recently used at one or more ATMs 106 to make a cash withdrawal. In this way, the fraud analysis circuit 144 can determine that a quick succession of cash withdrawals is being made using a single transaction card 101, which is indicative of fraudulent activity. In addition, the fraud analysis circuit 144 also determines whether the same transaction card 101 (e.g., transaction card number) is being used simultaneously across multiple ATMs 106. In this way, the fraud analysis circuit 144 can immediately determine that fraudulent activity is occurring due to the fact that a single transaction card 101 cannot possibly be used in two locations at separate ATMs 106 at the same time. Furthermore, the fraud analysis circuit 144 also determines whether large sums of cash are being withdrawn using the transaction card 101 from the identified ATMs 106. If large sums of cash are being withdrawn in successive transactions using the same transaction card 101, the fraud analysis circuit 144 may determine that fraudulent activity is occurring at the ATMs 106. Moreover, the fraud analysis circuit 144 also determines whether a total amount of withdrawals from a particular ATM 106 have exceeded the typical amount of withdrawals for that particular ATM 106 (e.g., the ATM 106 usually has $100,000 of withdrawals, but now has $150,000 of withdrawals, etc.). Using this information, the fraud analysis circuit 144 can determine that fraudulent activity is occurring at the ATM 106.

With the help of the adaptive processing circuit 146, as described further herein, the fraud analysis circuit 144 adapts to the changing behaviors of fraudsters such that even when fraudsters change the methods they use to attempt to successfully complete fraudulent activity, the ATM fraud management system 130 catches and flags that new behavior as fraudulent. The machine learning model described herein is retrained (e.g., by the adaptive processing circuit 146) to capture any drift over time relating to the behavior of fraudsters. This type of adaptive behavior cannot be done with traditional code or rules-based methods.

The fraud analysis circuit 144 also calculates and/or generates a probability factor representative of the likelihood that a fraudulent transaction is occurring or has occurred at one or more ATMs 106. The fraud analysis circuit 144 calculates and/or generates a probability factor using the received real-time ATM 106 and transaction data and historical data stored in the databases of the ATM fraud management system 130. The probability factor is calculated as a percentage of likelihood that fraudulent activity is occurring or has occurred at one or more ATMs 106. For example, the probability factor ranges from 0% to 100%. In this example, a probability factor of 0% is a definite likelihood of no fraudulent activity and a probability factor of 100% is a definite likelihood of fraudulent activity. In other arrangements, the probability factor may take on other forms, such as a rating ranging from one to ten. In other arrangements, the probability factor reflects a relative "likely" or "unlikely" indication. For example, if the fraud analysis circuit 144 determines that there is a likelihood of 95% that fraudulent activity is occurring, a "likely" probability factor is given. On the other hand, if the fraud analysis circuit 144 determines that there is a likelihood of 15% that fraudulent activity is occurring, an "unlikely" probability factor is given.

The fraud analysis circuit 144 communicates the fraudulent activity determination and probability factor to the remedial action circuit 148. Depending on the probability factor, type, or severity of fraudulent activity, the remedial action circuit 148 may determine to use different types of remedial actions, as described further herein. In addition to the probability that fraudulent activity is occurring, varying levels of severity of fraudulent activity may be detected. For example, a fraudster may have used a stolen transaction card to make a few withdrawals sequentially at an ATM 106. This type of behavior may be labeled as a lower level of fraudulent activity. As another example, a group of fraudsters may have used transaction card information to reproduce several transaction cards having the same transaction card information and use the cards at multiple ATMs 106 in different locations to withdrawal cash at the same time. This type of behavior may be labeled as a higher level of fraudulent activity and a different, higher level type of remedial action may be taken in response.

The adaptive processing circuit 146 is structured to facilitate determination of fraudulent activity, for example using artificial intelligence processing and/or machine learning techniques as described herein. For example, in some embodiments, the adaptive processing circuit 146 is structured to generate a machine learning model that uses a Decision Tree Classifier Algorithm. Other types of algorithms may be used, such as Random Forests, XGBoost, AdaBoost, etc. In this regard, the adaptive processing circuit 146 is structured to develop and/or revise the model used to determine fraudulent activity and remedial actions based on the generated machine learning model. The adaptive processing circuit 146 is also structured to retrain the machine learning model. The adaptive processing circuit 146 communicates with the fraud analysis circuit 144 to update the machine learning model used to detect fraudulent activity. As such, the adaptive processing circuit 146 is communicably and operatively coupled to the fraud analysis circuit 144 to communicate updated machine learning information, rules, and methods. The adaptive processing circuit 146 is described in further detail with reference to FIG. 3.

The remedial action circuit 148 is structured to determine one or more remedial actions to be taken in response to a detection of fraudulent activity as determined by the fraud analysis circuit 144 and complete the remedial action. The remedial action circuit 148 receives an indication of a detection of fraudulent activity from the fraud analysis circuit 144. The indication may include information relating to the type of fraudulent activity, such as a cash withdrawal at one or more ATMs 106 using a stolen or fraudulently reproduced transaction card 101. Other information communicated to the remedial action circuit 148 may include, but is not limited to, the number of ATMs 106 involved in the fraudulent activity, the amount of money withdrawn from the ATMs 106, the number of transaction cards stolen or reproduced, etc. Based on the type or severity of the fraudulent activity, the remedial action circuit 148 determines a remedial action to take in response. Remedial actions may include, but are not limited to, cancelling a transaction card, notifying the card-issuing institution, capturing a picture of a fraudster at an ATM 106, disabling one or more ATMs 106, alerting authorities to the fraudulent activity, etc. The remedial action circuit 148 may also generate a notification or alert to the user, a manager of the ATMs 106, or to local authorities. Accordingly, the remedial action circuit 148 may be communicably and operatively coupled to the other circuits in the ATM fraud management system 130 and the ATM 106 to complete such actions.

For example, if the remedial action circuit 148 receives information that fraudulent activity was detected involving a single cash withdrawal with a single transaction card 101 at a single ATM 106, the remedial action circuit 148 may determine to take a first level of remedial action in response. As an example, the first level of remedial action may include cancelling or declining the transaction. As another example, if the remedial action circuit 148 receives information that fraudulent activity was detected involving multiple successive cash withdrawals using a single transaction card 101 at a single ATM 106, the remedial action circuit 148 may determine to take a second level of remedial action in response. The second level of remedial action may include cancelling the stolen or reproduced transaction card and taking a picture or recording video of the fraudster at the ATM 106. As another example, if the remedial action circuit 148 receives information that fraudulent activity was detected involving multiple cash withdrawals using multiple transaction cards 101 reproduced from the same transaction card information at multiple ATMs 106, the remedial action circuit 148 may determine to take a third level of remedial action in response. The third level of remedial action may include cancelling the transaction card, taking pictures or recording video of the fraudsters at the ATMs 106, disabling one or more of the ATMs 106, and notifying local authorities. The levels of remedial action described herein can vary to include different, more, or fewer of the remedial actions in response to different types or severity of fraudulent activity. In addition, various other intermediate levels of remedial actions may also be included such that more than three levels of remedial action may be taken.

Figure 3:
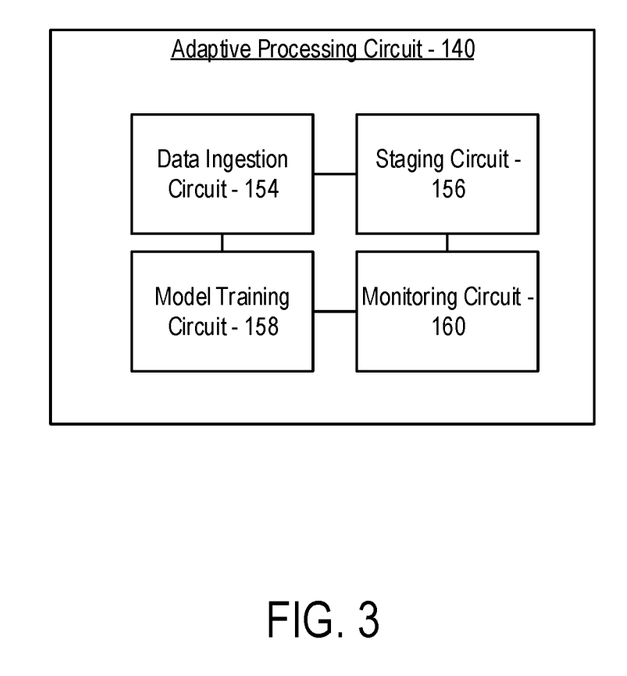
FIG. 3 is a block diagram depicting an adaptive processing circuit of the ATM fraud management system of FIG. 2, according to an example embodiment.

Referring now to FIG. 3, the adaptive processing circuit 146 is shown in greater detail, according to an example embodiment. In this example embodiment, the adaptive processing circuit 146 is generally structured to train and operate a machine learning model for developing a set of fraudulent activity determination rules and remediate action rules. The machine learning model can include various algorithms to create and update predictive models, recognize previously unknown patterns of fraudulent activity, and/or develop deep insights relating to fraudulent activity. The rules can be developed using any supervised machine learning model and/or an unsupervised machine learning model. As described herein, a Decision Tree Classifier Algorithm is used, but any machine learning model can be used, such as Random Forests, AdaBoost, XGBoost, Bayesian networks, link analysis, classification, linear regression, logistic regression, dimension reduction, clustering, principal component analysis, anomaly-detection, etc. In some embodiments, a classification model can be initially used to associate each fraud case with either one of two groups. The first group can correspond to fraud cases relating to a sufficient risk of fraudulent activity, and the second group can correspond to fraud cases relating to an acceptable risk of fraudulent activity such that fraud cases of the second group can be automatically closed. As noted above, the machine learning model is a single layer model composed of the Decision Tree Classifier Algorithm. The machine learning model receives an input of discrete attributes of the data (e.g., approximately 40 features) and classifies the attributes into one of several (e.g., five) output classes, which indicate whether or not fraudulent activity is occurring, and if so, what type of fraudulent activity. In some embodiments, the adaptive processing circuit 146 works with the fraud analysis circuit 144 to make a determination of fraudulent activity. In some embodiments, the adaptive processing circuit 146 completes the determination of fraudulent activity by itself.

The adaptive processing circuit 146 is shown to include a data ingestion circuit 154, a model training circuit 156, a staging circuit 158, and a monitoring circuit 160. The data ingestion circuit 154 is structured to receive data relating to fraudulent activity. The data ingestion circuit 154 can be structured to receive or ingest data using any suitable platform or method. The received data includes sets of fraudulent activity information or fraud cases, and can include any data source, such as the ATM 106 and/or a component of the ATM fraud management system 130. In some arrangements, the data ingestion circuit 154 receives transaction data directly from the ATM 106. In some arrangements, the data ingestion circuit 154 receives data from the fraud analysis circuit 144. In some arrangements, fraudulent activity information is retrieved from one or more of the databases included with the ATM fraud management system 130, e.g., ATM database 136, transaction database 138, fraud database 140, action database 142, to facilitate retraining of the model.

In some embodiments, the data ingestion circuit 154 is structured to receive streaming data. For example, transaction data or fraud cases can be provided in real-time or near real-time as the transactions occur. In other embodiments, the data ingestion circuit 154 is structured to receive data in batches. The data ingestion circuit 154 can be structured to use any suitable or convention system of data abstraction. In some embodiments, received data is registered in a data registry database.

The adaptive processing circuit 146 is shown to further include a staging circuit 156 and a model training circuit 158. The staging circuit 156 is structured to hold relevant data for training. In some embodiments, the staging circuit 156 is structured to hold a set of training data, a set of test data, and/or a set of validation data. The staging circuit 156 may also be structured to transform the data, normalize the data, clean the data, and/or encode the data in a suitable format for processing by the model training circuit 158. In some embodiments, the staging circuit 156 is structured to perform an error correction process and can be structured to perform one or more processes relating to data classification, feature generation, visualization, and sample selection for training and testing. The model training circuit 158 is structured to perform a training process. The model training circuit 158 is structured to receive the training data for training the model. In some embodiments, the model training circuit 158 is structured to select one or more preferred machine learning algorithms. The model training circuit 158 can also be structured to experiment, test, tune, and evaluate the model. In this regard, the model training circuit 158 can be structured to receive the set of test data and/or the set of validation data (e.g., from the data ingestion circuit 154, staging circuit 156, and/or monitoring circuit 160).

The adaptive processing circuit 146 is shown to further include a monitoring circuit 160. The monitoring circuit 160 is structured to receive information relating to a trained model from the model training circuit 158 and facilitate real-time or batch scoring of the model, and deploy the model in an application (e.g., deploy model to be used by the fraud analysis circuit 144). The monitoring circuit 160 can be structured to provide this information to the model training circuit 158 for retraining the model. The monitoring circuit 160 may also be structured to receive and store information relating to insights or patterns of the model. Stored information may be transmitted to the data ingestion circuit 154. Accordingly, to facilitate the retraining of the machine learning model used to determine fraudulent activity (e.g., by the fraud analysis circuit 144), the monitoring circuit 160 is communicably and operatively coupled to the other circuits of the adaptive processing circuit 146 and the fraud analysis circuit 144.

Figure 4:
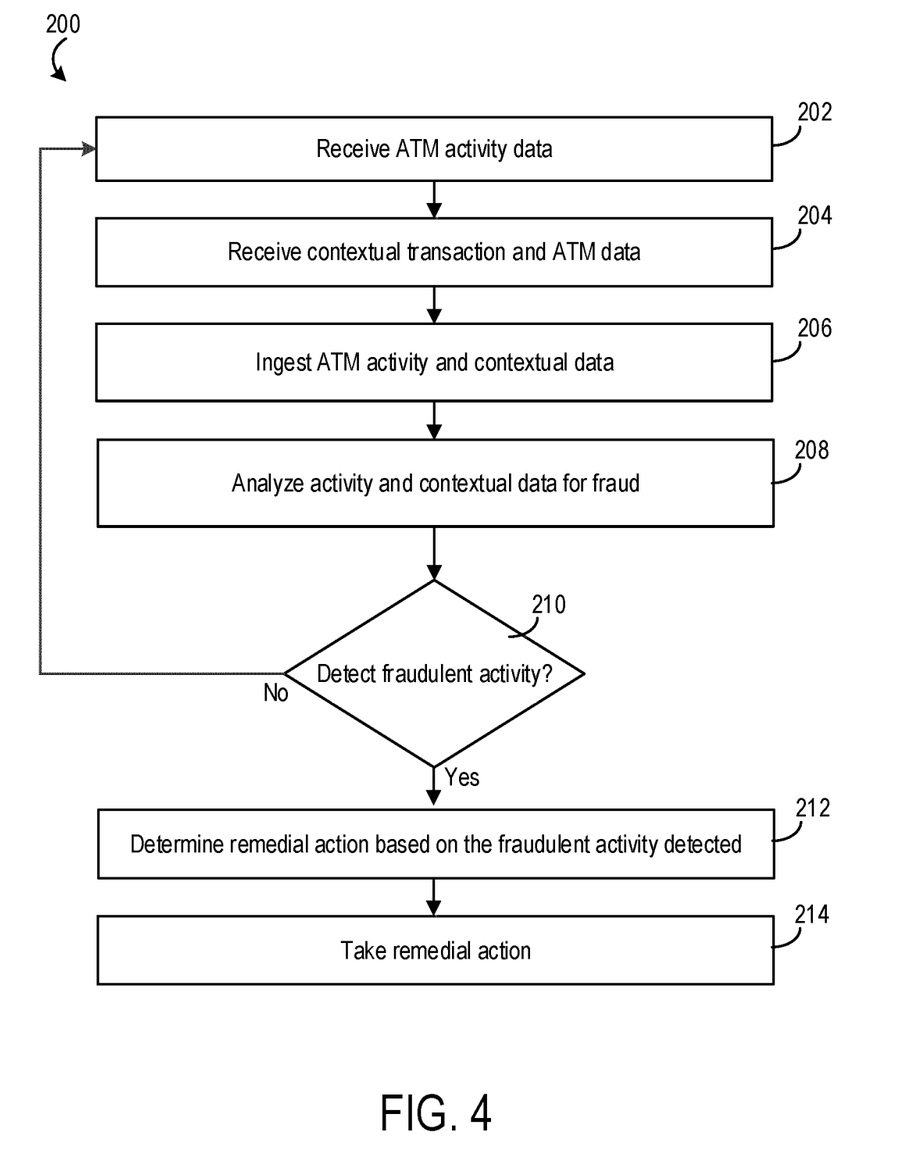
FIG. 4 is a flow diagram depicting a method for detecting real-time ATM fraudulent activity using a machine learning model, according to an example embodiment.

Referring now to FIG. 4, a flow diagram of a method 200 of providing real-time ATM fraudulent activity detection using machine learning is shown, according to an example embodiment. In various embodiments, the method 200 is performed by the components shown in FIGS. 1-3 such that reference may be made to the components of FIGS. 1-3 to aid the description of the method 200.

ATM activity data is received at 202. In some arrangements, the ATM activity data is received by the provider computing system 104 and communicated to the ATM fraud management system 130. In some arrangements, the ATM activity data is received directly by the fraud analysis circuit 144. The ATM activity data is indicative of a transaction taking place at one or more ATMs 106. In some arrangements, the ATM activity data includes that a transaction card 101 has been swiped, dipped, or inserted into the ATM 106 and a transaction has begun. The ATM activity data is received in a real-time manner such that the provider computing system 104 is able to monitor (e.g., via the fraud analysis circuit 144) the activity at the ATM 106 while the transaction is happening.

Contextual transaction and ATM data is received at 204. In some arrangements, the fraud analysis circuit 144 is structured to receive data regarding various transactions occurring at the one or more ATMs 106, including both transaction data and ATM identification data. The contextual transaction and ATM data is received in real-time from the ATM 106 as the transaction is occurring. The received data includes, but is not limited to, transaction card 101 information (including a card number), ATM 106 information (including an ATM identification), and transaction information (including a transaction amount, time, date, and authorization code). In some arrangements, the fraud analysis circuit 144 also communicates with the ATM database 136, transaction database 138, and fraud database 140 to retrieve various data regarding historical transaction activity and historical activity at the ATMs 106. The ATM identification allows the ATM fraud management system 130 to determine both the ATMs 106 that are part of a certain transaction occurring in real-time and historical data regarding a particular ATM 106. The transaction information allows the ATM fraud management system 130 to determine both the transaction information relating to an ongoing, current transaction and historical data regarding transactions.

ATM activity and contextual data is ingested at 206. In some arrangements, the ATM activity and contextual data is ingested by the fraud analysis circuit 144, which uses a real-time up-to-date machine learning model to analyze the data. In some alternative or additional arrangements, the ATM activity and contextual data is ingested by the data ingestion circuit 154 of the adaptive processing circuit 140. In this way, the received and ingested data may be used as part of a retraining of the machine learning model.

ATM activity and contextual data is analyzed for fraud at 208. The fraud analysis circuit 144 analyzes the data as part of the determination of whether fraudulent activity is occurring or has occurred at the identified ATMs 106. The fraud analysis circuit 144 works with the adaptive processing circuit 146 to use a trained machine learning model to determine whether the data is indicative of fraudulent activity. For example, using the retrieved, real-time and the stored historical data, the fraud analysis circuit 144 uses a machine learning model, developed and retrained by the adaptive processing circuit 146 to analyze whether the same or similar cash withdrawal activity has recently occurred at the identified ATMs 106.

A determination of whether fraudulent activity is detected is made at 210. In some arrangements, the fraud analysis circuit 144 determines whether the same transaction card 101 (e.g., same transaction card number) has been used to make a cash withdrawal recently at the identified ATMs 106. In this way, the fraud analysis circuit 144 can determine whether a quick succession of cash withdrawals using the same transaction card 101 information is occurring at the identified ATMs 106 such that remedial action can be taken in real-time while the withdrawals are occurring. The fraud analysis circuit 144 also analyzes whether the same transaction card 101 (e.g., transaction card number) is being used simultaneously across multiple ATMs 106. In this way, the fraud analysis circuit 144 can immediately determine that fraudulent activity is occurring (e.g., due to the fact that a single transaction card 101 cannot possibly be used in two locations at separate ATMs 106 at the same time). Furthermore, the fraud analysis circuit 144 also determines whether large sums of cash are being withdrawn using the transaction card 101 from the identified ATMs 106. If large sums of cash are being withdrawn in successive transactions using the same transaction card 101, the fraud analysis circuit 144 may determine that fraudulent activity is occurring at the ATMs 106.

If fraudulent activity is detected at 210, one or more remedial actions are determined based on the fraudulent activity detected at 212. In some arrangements, the remedial action circuit 148 determines the appropriate remedial action to take in response to the detection of fraudulent activity. The remedial action circuit 148 receives an indication of a detection of fraudulent activity from the fraud analysis circuit 144. The indication may include information relating to the type of fraudulent activity, such as a cash withdrawal at one or more ATMs 106 using a stolen or fraudulently reproduced transaction card 101. Other information communicated to the remedial action circuit 148 may include, but is not limited to, the number of ATMs 106 involved in the fraudulent activity, the amount of money withdrawn from the ATMs 106, the number of transaction cards stolen or reproduced, etc. Based on the type or severity of the fraudulent activity, the remedial action circuit 148 determines a remedial action to take in response. If fraudulent activity is not detected at 210, the method 200 returns to step 202, where ATM activity data is received in continual, real-time manner.

A determined remedial action is taken at 214. In some arrangements, the remedial action circuit 148 completes the determined remedial action. Remedial actions may include, but are not limited to, cancelling a transaction card, capturing a picture of a fraudster at an ATM 106, disabling one or more ATMs 106, alerting authorities to the fraudulent activity, etc. The remedial action circuit 148 may also generate a notification or alert to the user, a manager of the ATMs 106, or to local authorities. Accordingly, the remedial action circuit 148 may be communicably and operatively coupled to the other circuits in the ATM fraud management system 130 and the ATM 106 to complete such actions. The remedial action circuit 148 completes varying levels of remedial actions based on the severity or level of fraudulent activity determined by the fraud analysis circuit 144. The levels of remedial action described herein can vary to include different, more, or fewer of the remedial actions in response to different types or severity of fraudulent activity. In addition, various other intermediate levels of remedial actions may also be included such that more than three levels of remedial action may be taken.

Figure 5:
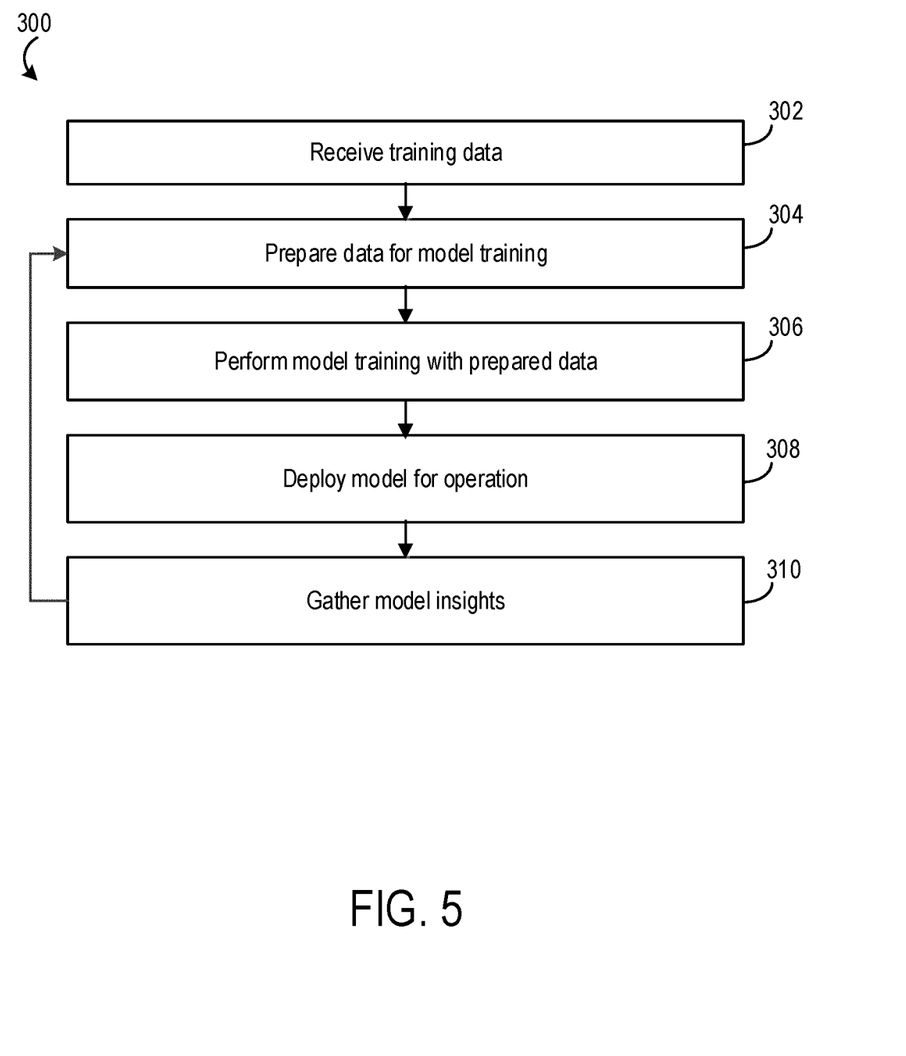
FIG. 5 is a flow diagram depicting a method for training a machine learning model for detecting real-time ATM fraudulent activity, according to an example embodiment.

Referring now to FIG. 5, a flow diagram of a method 300 for generating a machine learning model is shown, according to an example embodiment. Method 300 is used to generate a machine learning model for detecting real-time fraudulent activity at an ATM 106. In various embodiments, the method 300 is performed by the components shown in FIGS. 1-3 such that reference may be made to the components of FIGS. 1-3 to aid the description of the method 300. In various embodiments, method 300 can relate to generating any supervised machine learning model and/or unsupervised machine learning model, such as Decision Tree Classifier Algorithms, Random Forests, AdaBoost, XGBoost, Bayesian networks, link analysis, classification, linear regression, logistic regression, dimension reduction, clustering, principal component analysis, anomaly-detection, etc.

Training data is received at 302. In some arrangements, training can be received in batch or streaming, using any suitable platform. The training data can be received from any number of data sources, such as a component of the provider computing system 104 and the ATMs 106. In some embodiments, received data relates to sets of fraud cases. In some embodiments, received data relates to transaction data or fraud cases provided in real-time or near real-time as the transactions occur. Received data is prepared for model training at 304. Preparing the data can relate to transforming the data, normalizing the data, cleaning the data, and/or encoding the data in a suitable format for processing by the model training circuit 158. In some embodiments, step 304 includes performing a data abstraction process.

Model training is performed at 306. In various arrangements, model training can include training a model using a first dataset, testing the model using a second dataset, and/or validating the model using a third dataset. Embodiments can use any suitable model training process and can be based on the type of model used. The model is deployed for operation at 308. In various arrangements, model deployment can relate to batch scoring of the model, exposing the model as a service, real-time scoring, and/or deploy the model in an application. In some embodiments, model deployment includes receiving a case disposition associated with each fraud case. The case disposition can be used to gather model insights at 310. In some embodiments, the model insights include case disposition information for retraining the model as described herein. In this regard, the method 300 may return to step 304.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively, or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method comprising:
receiving, by a provider computing system in communication with one or more automated teller machines (ATMs), ATM activity data indicative of one or more withdrawal transactions at the one or more ATMs, the one or more withdrawal transactions performed using a transaction card;
receiving, by the provider computing system from the one or more ATMs, transaction data and ATM data corresponding to the one or more withdrawal transactions;
generating, by the provider computing system, an indication that the transaction data and the ATM data correspond to fraudulent activity by providing the transaction data and the ATM data as input to a machine learning model, the machine learning model trained to output a type of fraudulent activity based on a set of training data that indicates a number of ATMs and a withdrawal amount involved in known fraudulent activities; and
selecting, by the provider computing system, one or more remedial actions responsive to the determination of fraudulent activity using the machine learning model, the one or more remedial actions selected based on a success rate of previously selected remedial actions for the type of the fraudulent activity detected using the machine learning model,
wherein the one or more remedial actions comprise at least one of canceling the transaction card, providing a notification to a card-issuing entity associated with the transaction card, transmitting a notification to a user device, and capturing an image of a fraudster at the one or more ATMs.

2. The method of claim 1, wherein the machine learning model uses a Decision Tree Classifier Algorithm.

3. The method of claim 1, further comprising analyzing, by the provider computing system, the transaction data and the ATM data, wherein analyzing the transaction data and the ATM data comprises communication between a fraud analysis circuit and an adaptive processing circuit, the adaptive processing circuit providing an updated machine learning model to the fraud analysis circuit to use as part of analyzing the transaction data and the ATM data.

4. The method of claim 3, wherein the adaptive processing circuit retrieves stored ATM data, stored transaction data, and an original machine learning model to develop the updated machine learning model.

5. The method of claim 4, wherein the adaptive processing circuit retrieves historical fraud information from one or more databases of the provider computing system and retrains the original machine learning model based on the historical fraud information to develop the updated machine learning model.

6. The method of claim 1, further comprising:
determining, by the provider computing system, the type of fraudulent activity determined by the transaction data and the ATM data; and
determining, by the provider computing system, the one or more remedial actions are determined based on the type of fraudulent activity.

7. The method of claim 6, further comprising at least one of canceling the transaction card and notifying the card-issuing entity associated with the transaction card that the transaction data and the ATM data indicate fraudulent activity.

8. A provider computing system, comprising:
a network interface; and
a processing circuit comprising one or more processors coupled to non-transitory memory, the memory comprising an automated teller machine (ATM) database and a transaction database, and wherein the processing circuit is configured to:
receive ATM activity data indicative of one or more withdrawal transactions at one or more ATMs, the one or more withdrawal transactions performed using a transaction card;
receive, from the one or more ATMs, transaction data and ATM data corresponding to the one or more withdrawal transactions;
generate an indication that the transaction data and the ATM data correspond to fraudulent activity by providing the transaction data and the ATM data as input to a machine learning model, the machine learning model trained to output a type of fraudulent activity based on a set of training data that indicates a number of ATMs and a withdrawal amount involved in known fraudulent activities; and
select one or more remedial actions responsive to the determination of fraudulent activity using the machine learning model, the one or more remedial actions selected based on a success rate of previously selected remedial actions for the type of the fraudulent activity detected using the machine learning model,
wherein the one or more remedial actions comprise at least one of canceling the transaction card, transmitting a notification to a card-issuing entity associated with the transaction card, transmitting a notification to a user device, or capturing an image of a fraudster at the one or more ATMs.

9. The system of claim 8, wherein the machine learning model uses a Decision Tree Classifier Algorithm.

10. The system of claim 8, wherein analysis of the transaction data and the ATM data comprises communication between a fraud analysis circuit and an adaptive processing circuit, the adaptive processing circuit providing an updated machine learning model to the fraud analysis circuit to use as part of the analysis of the transaction data and the ATM data.

11. The system of claim 10, wherein the adaptive processing circuit retrieves stored ATM data from the ATM database, stored transaction data from the transaction database, and an original machine learning model to develop the updated machine learning model.

12. The system of claim 11, wherein the adaptive processing circuit retrieves historical fraud information from one or more databases of the provider computing system and retrains the original machine learning model based on the historical fraud information to develop the updated machine learning model.

13. The system of claim 8, further comprising:
determining, by the provider computing system, the type of fraudulent activity determined by the transaction data and the ATM data; and
determining, by the provider computing system, the one or more remedial actions are determined based on the type of fraudulent activity.

14. The system of claim 8, further comprising at least one of canceling the transaction card and notifying the card-issuing entity associated with the transaction card based on the determination that the transaction data and the ATM data indicate fraudulent activity.

* * * * *